United States Patent
Ozbas

(10) Patent No.: US 8,604,936 B2
(45) Date of Patent: Dec. 10, 2013

(54) COAXIAL CABLE CONNECTOR, SYSTEM AND METHOD OF USE THEREOF

(75) Inventor: Murat Ozbas, Rochester, NY (US)

(73) Assignee: PPC Broadband, Inc., East Syracuse, NY (US)

(*) Notice: Subject to any disclaimer, the term of this patent is extended or adjusted under 35 U.S.C. 154(b) by 416 days.

(21) Appl. No.: 12/966,015

(22) Filed: Dec. 13, 2010

(65) Prior Publication Data

US 2012/0146662 A1    Jun. 14, 2012

(51) Int. Cl.
  *G08B 21/00*    (2006.01)
(52) U.S. Cl.
  USPC ............... 340/635; 235/440; 324/654
(58) Field of Classification Search
  USPC ............ 340/635, 572.7, 10.1, 10.3, 10.4; 324/654; 235/439, 440
  See application file for complete search history.

(56) References Cited

U.S. PATENT DOCUMENTS

| | | |
|---|---|---|
| 2,640,118 A | 5/1953 | Werner |
| 3,196,424 A | 7/1965 | Hardesty et al. |
| 3,388,590 A | 6/1968 | Bond |
| 3,396,339 A | 8/1968 | Miram |
| 3,524,133 A | 8/1970 | Arndt |
| 3,657,650 A | 4/1972 | Arndt |
| 3,686,623 A | 8/1972 | Nijman |
| 3,768,089 A | 10/1973 | Costanzo |
| 3,808,580 A | 4/1974 | Johnson |
| 3,945,704 A | 3/1976 | Kraus et al. |
| 3,960,428 A | 6/1976 | Naus et al. |
| 3,961,330 A | 6/1976 | Davis |
| 4,034,289 A | 7/1977 | Rozylowicz et al. |
| 4,084,875 A | 4/1978 | Yamamoto |
| 4,240,445 A | 12/1980 | Iskander et al. |
| 4,421,377 A | 12/1983 | Spinner |
| 4,489,419 A | 12/1984 | Wang |
| 4,758,459 A | 7/1988 | Mehta |
| 4,777,381 A | 10/1988 | Fernandes |
| 4,898,759 A | 2/1990 | Hoover et al. |
| 4,911,655 A | 3/1990 | Pinyan et al. |
| 4,915,639 A | 4/1990 | Cohn et al. |
| 4,927,382 A | 5/1990 | Huber |
| 5,059,948 A | 10/1991 | Desmeules |
| 5,076,797 A | 12/1991 | Moulton |
| 5,169,329 A | 12/1992 | Taguchi |
| 5,194,016 A | 3/1993 | Hatagishi et al. |
| 5,217,391 A | 6/1993 | Fisher, Jr. |
| 5,225,816 A | 7/1993 | Lebby et al. |
| 5,278,525 A | 1/1994 | Palinkas |
| 5,278,571 A | 1/1994 | Helfrick |
| 5,345,520 A | 9/1994 | Grile |

(Continued)

FOREIGN PATENT DOCUMENTS

EP    0527599 A1    2/1993

OTHER PUBLICATIONS

Office Action (Mail Date: May 19, 2011) for U.S. Appl. No. 12/630,460, filed Dec. 3, 2009.
U.S. Appl. No. 12/630,460, filed Dec. 3, 2009.

(Continued)

*Primary Examiner* — John A Tweel, Jr.
(74) *Attorney, Agent, or Firm* — Hiscock & Barclay, LLP

(57) ABSTRACT

Disclosed herein is a coaxial cable connector that includes a backscattering arrangement configured to receive an RF signal in a coaxial transmission line and produce a modulated backscattered response. The modulated backscattered response corresponds to a sensed condition in the coaxial cable connector.

32 Claims, 8 Drawing Sheets

(56) References Cited

U.S. PATENT DOCUMENTS

| | | |
|---|---|---|
| 5,355,883 A | 10/1994 | Ascher |
| 5,462,450 A | 10/1995 | Kodama |
| 5,490,033 A | 2/1996 | Cronin |
| 5,491,315 A | 2/1996 | McMills et al. |
| 5,518,420 A | 5/1996 | Pitschi |
| 5,561,900 A | 10/1996 | Hosler, Sr. |
| 5,565,783 A | 10/1996 | Lau et al. |
| 5,565,784 A | 10/1996 | DeRenne |
| 5,620,330 A | 4/1997 | Pizon |
| 5,664,962 A | 9/1997 | Noda |
| 5,892,430 A | 4/1999 | Wiesman et al. |
| 5,904,578 A | 5/1999 | Kubota et al. |
| 5,924,889 A | 7/1999 | Wang |
| 6,034,521 A | 3/2000 | Eckardt |
| 6,041,644 A | 3/2000 | Harde |
| 6,093,043 A | 7/2000 | Gray et al. |
| 6,134,774 A | 10/2000 | Williams et al. |
| 6,193,568 B1 | 2/2001 | Dorr |
| 6,236,551 B1 | 5/2001 | Jones et al. |
| 6,243,654 B1 | 6/2001 | Johnson et al. |
| 6,362,709 B1 | 3/2002 | Paxman et al. |
| 6,367,697 B1 * | 4/2002 | Turner et al. ............... 235/440 |
| 6,414,636 B1 | 7/2002 | Godard et al. |
| 6,490,168 B1 | 12/2002 | Rochowicz et al. |
| 6,549,017 B2 | 4/2003 | Coffeen |
| 6,570,373 B1 | 5/2003 | Viola |
| 6,618,515 B2 | 9/2003 | Kimura et al. |
| 6,646,447 B2 | 11/2003 | Cern et al. |
| 6,650,885 B2 | 11/2003 | Anderson et al. |
| 6,755,681 B2 | 6/2004 | Chen |
| 6,783,389 B1 | 8/2004 | Lee |
| 6,859,029 B2 | 2/2005 | Yamanaka et al. |
| 6,896,541 B2 | 5/2005 | Benson |
| 6,986,665 B2 | 1/2006 | Schauz et al. |
| 7,029,327 B2 | 4/2006 | Devine |
| 7,084,769 B2 | 8/2006 | Bauer et al. |
| 7,094,104 B1 | 8/2006 | Burke et al. |
| 7,105,982 B1 | 9/2006 | Hagood, IV et al. |
| 7,173,343 B2 | 2/2007 | Kugel |
| 7,212,125 B2 | 5/2007 | Shanks et al. |
| 7,253,602 B2 | 8/2007 | Shvach et al. |
| 7,254,511 B2 | 8/2007 | Niedzwiecki et al. |
| 7,262,626 B2 | 8/2007 | Iwasaki |
| 7,264,493 B2 | 9/2007 | Cooper et al. |
| 7,266,269 B2 | 9/2007 | Koste et al. |
| 7,268,517 B2 | 9/2007 | Rahmel et al. |
| 7,276,267 B2 | 10/2007 | Schauz |
| 7,276,703 B2 | 10/2007 | Berkcan et al. |
| 7,368,827 B2 | 5/2008 | Kulkarni et al. |
| 7,413,353 B2 | 8/2008 | Beer et al. |
| 7,440,253 B2 | 10/2008 | Kauffman |
| 7,472,587 B1 | 1/2009 | Loehndorf et al. |
| 7,479,886 B2 | 1/2009 | Burr |
| 7,482,945 B2 | 1/2009 | Hall |
| 7,507,117 B2 | 3/2009 | Amidon |
| 7,513,795 B1 | 4/2009 | Shaw |
| 7,544,086 B1 | 6/2009 | Wells |
| 7,595,647 B2 * | 9/2009 | Kroh et al. ............... 324/654 |
| 7,642,611 B2 | 1/2010 | Tsuji et al. |
| 7,733,236 B2 | 6/2010 | Montena et al. |
| 7,749,022 B2 | 7/2010 | Amidon et al. |
| 7,775,115 B2 | 8/2010 | Theuss et al. |
| 7,850,482 B2 | 12/2010 | Montena et al. |
| 7,909,637 B2 | 3/2011 | Montena |
| 7,930,118 B2 | 4/2011 | Vinden et al. |
| 8,092,234 B2 | 1/2012 | Friedhof et al. |
| 8,149,127 B2 | 4/2012 | Montena |
| 2002/0090958 A1 | 7/2002 | Ovard et al. |
| 2003/0096629 A1 | 5/2003 | Elliott et al. |
| 2003/0148660 A1 | 8/2003 | Devine |
| 2004/0232919 A1 | 11/2004 | Lacey |
| 2006/0019540 A1 | 1/2006 | Werthman et al. |
| 2007/0173367 A1 | 7/2007 | Duncan |
| 2008/0100451 A1 * | 5/2008 | Wulff ............... 340/572.7 |
| 2008/0258876 A1 | 10/2008 | Overhultz et al. |
| 2009/0022067 A1 * | 1/2009 | Gotwals ............... 370/254 |
| 2009/0096466 A1 | 4/2009 | Delforce et al. |
| 2009/0115427 A1 | 5/2009 | Radtke et al. |
| 2009/0284354 A1 | 11/2009 | Pinkham |
| 2010/0081324 A1 | 4/2010 | Montena |
| 2010/0124838 A1 | 5/2010 | Montena et al. |
| 2010/0124839 A1 | 5/2010 | Montena |
| 2010/0178806 A1 | 7/2010 | Montena |
| 2010/0194382 A1 | 8/2010 | Montena |
| 2011/0080158 A1 | 4/2011 | Lawrence et al. |
| 2011/0161050 A1 | 6/2011 | Montena et al. |
| 2011/0237125 A1 | 9/2011 | Montena |

OTHER PUBLICATIONS

U.S. Appl. No. 12/966,633, filed Dec. 13, 2010.
U.S. Appl. No. 12/964,319, filed Dec. 9, 2010.
U.S. Appl. No. 13/077,044, filed Mar. 31, 2011.
U.S. Appl. No. 12/732,723, filed Mar. 26, 2010.
U.S. Appl. No. 12/732,810, filed Mar. 26, 2010.
*Ex Parte Quayle* Action (Mail Date Jul. 17, 2012) for U.S. Appl. No. 12/732,810, filed Mar. 26, 2010.
*Ex Parte Quayle* Action (Mail Date Jul. 31, 2012) for U.S. Appl. No. 12/732,723, filed Mar. 26, 2010.
Notice of Allowance (Mail Date: Dec. 1, 2011) for U.S. Appl. No. 12/630,460, filed Dec. 3, 2009.

* cited by examiner

COAXIAL CABLE CONNECTOR, SYSTEM AND METHOD OF USE THEREOF

FIELD

The subject matter disclosed herein relates generally to the field of coaxial cable connectors. More particularly, the subject matter relates to a coaxial cable connector and system that is capable of ascertaining the status of a connection between the coaxial cable connector and a port and communicating the status to another location, and method of use thereof.

BACKGROUND

Cable communications have become an increasingly prevalent form of electromagnetic information exchange and coaxial cables are common conduits for transmission of electromagnetic communications. Many communication devices are designed to be connectable to coaxial cables. Accordingly, there are various types of coaxial cable connectors that commonly connect the coaxial cables to each other and to various communications devices.

It is important for a coaxial cable connector to facilitate an accurate, durable, and reliable connection so that cable communications may be exchanged properly. Thus, it is often important to ascertain the status of cable connectors. However, typical means and methods of ascertaining proper connection status are cumbersome and often involve costly procedures involving detection devices remote to the connector or physical, invasive inspection on-site.

Therefore, a coaxial cable connector that is capable of ascertaining the status of a connection between the coaxial cable connector and a port and communicating the status to another device, and method of use thereof, would be well received in the art.

BRIEF DESCRIPTION

According to one aspect, a coaxial cable connector comprises: a backscattering arrangement configured to receive an RF signal in a coaxial transmission line and produce a modulated backscattered response, the modulated backscattered response corresponding to a sensed condition in the coaxial cable connector.

According to another aspect, a coaxial cable connector comprises: means for receiving an RF signal in a coaxial transmission line and producing a modulated backscattered response, the modulated backscattered response corresponding to a sensed condition in the coaxial cable connector.

According to yet another aspect, a coaxial cable system comprises: a remote device configured to send an RF signal through a coaxial transmission line; and a coaxial cable connector connected to the RF port, the coaxial cable connector configured to receiving the RF signal in a coaxial transmission line and produce a backscattered response, the backscattered response being modulated in response to a sensed condition of the coaxial cable connector.

According to yet another aspect, a coaxial cable connector connection status ascertainment method comprises: sending an RF signal through a coaxial transmission line; receiving an RF signal by a coaxial cable connector connected to an RF port; producing a modulated backscattered response, by the coaxial cable connector, in response to the received RF signal, the modulated backscattered response corresponding to a sensed condition of the coaxial cable connector; and transmitting the modulated backscattered response, by the coaxial cable connector, to another location.

According to still another aspect, a coaxial cable connector for connection to an RF port comprises: a sensing circuit, positioned within the connector body, the sensing circuit configured to sense a condition of the connector when connected to the RF port; a signal generation component in operable communication with the sensing circuit, the signal generation component configured to generate a modulated signal that corresponds to a sensed condition by the sensing circuit; and a power harvester configured to harvest power from the coaxial transmission line usable by at least one component of the coaxial cable connector, the power harvester being operable during generation of the modulated signal by the signal generation component.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
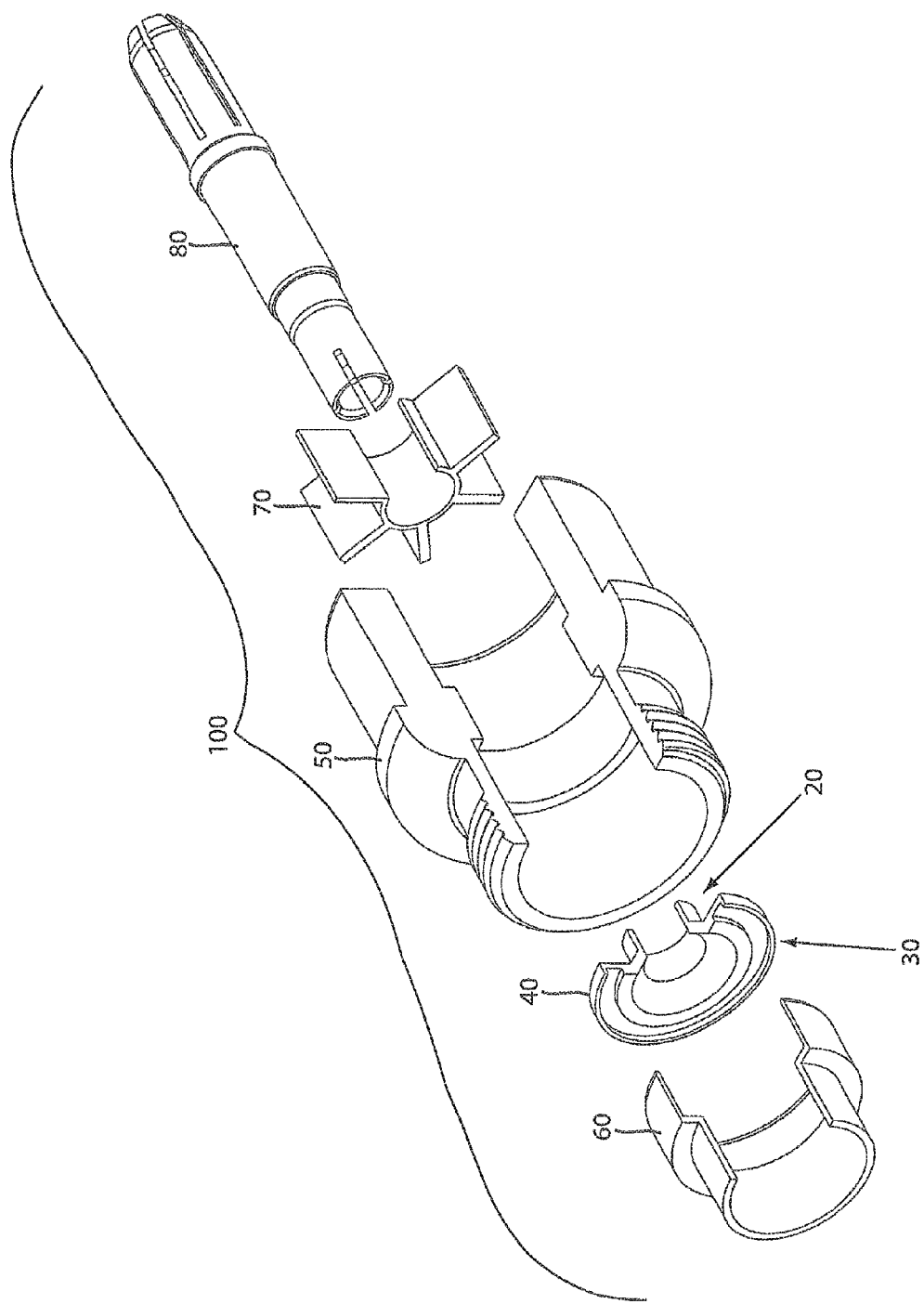
FIG. 1 depicts an exploded cut-away perspective view of a coaxial cable connector with a sensing circuit, in accordance with one embodiment.

A detailed description of the hereinafter described embodiments of the disclosed apparatus and method are presented herein by way of exemplification and not limitation with reference to the Figures.

Referring to FIGS. 1-5, an embodiment of a coaxial cable connector 100 with a connector body 50 and an internal sensing circuit 30 is shown. The sensing circuit 30 is configured to sense one or more conditions within the connector 100, as described herein below. The coaxial cable connector 100 further includes a backscattering arrangement 120 that may be located within the sensing circuit 30. The backscattering arrangement 120 is configured to receive an RF signal in a coaxial transmission line 10 and produce a modulated backscattered response 2 in response to a sensed condition of the coaxial cable connector 100. This modulated backscattered response 2 may then be sent to a remote location 140, 150 such as a head end 140 or a control room at a cell tower 150 so that the remote location 140, 150 can be informed of the sensed condition and respond accordingly. Furthermore, the coaxial cable connector 100 may include a power harvester 160 that is configured to harvest power from the coaxial transmission line 10 such that the harvested power is usable by at least one component or components of the coaxial cable connector 100, such as the backscattering arrangement 120. The power harvester 160 may be operable during generation of the modulated response 120 by the coaxial cable connector 100. The various elements that may comprise the coaxial cable connector 100 will now be described in detail herein below.

Figure 2:
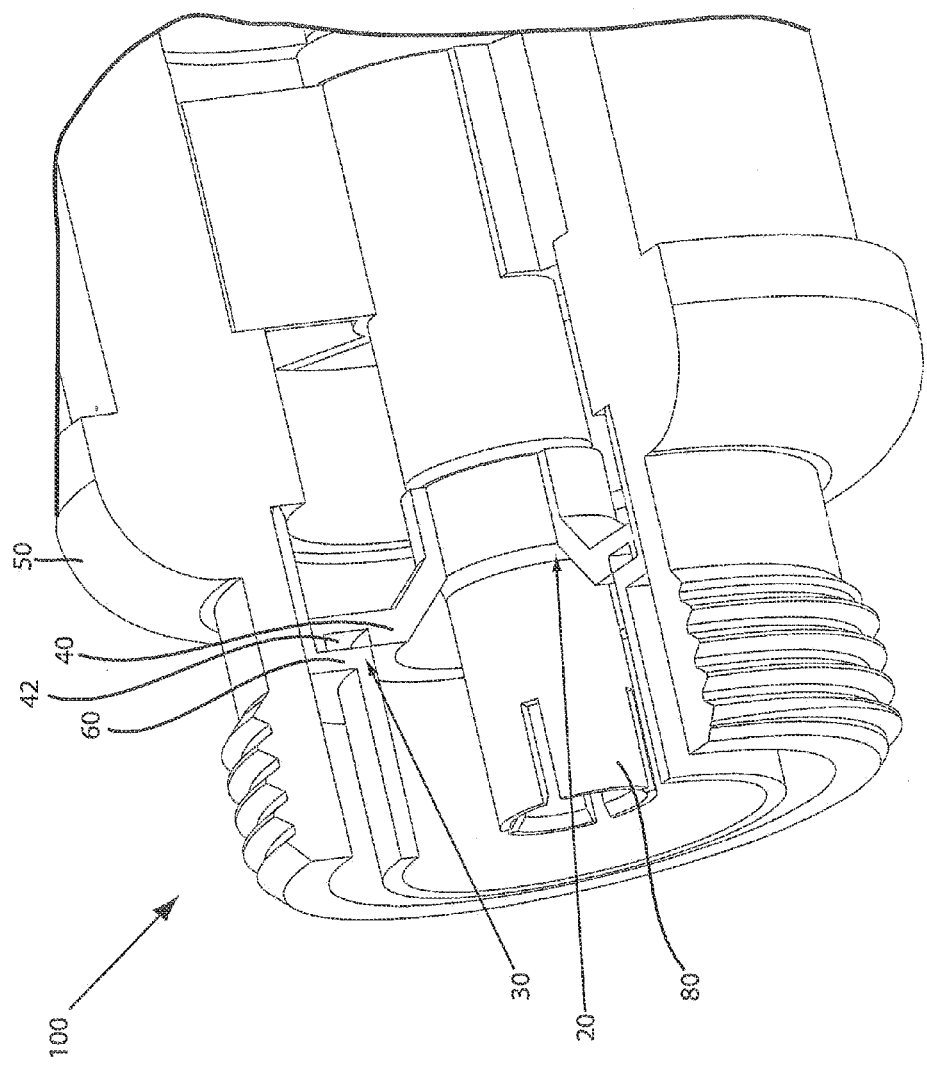
FIG. 2 depicts a close-up cut-away partial perspective view of the coaxial cable connector of FIG. 1, in accordance with one embodiment.
Figure 3:
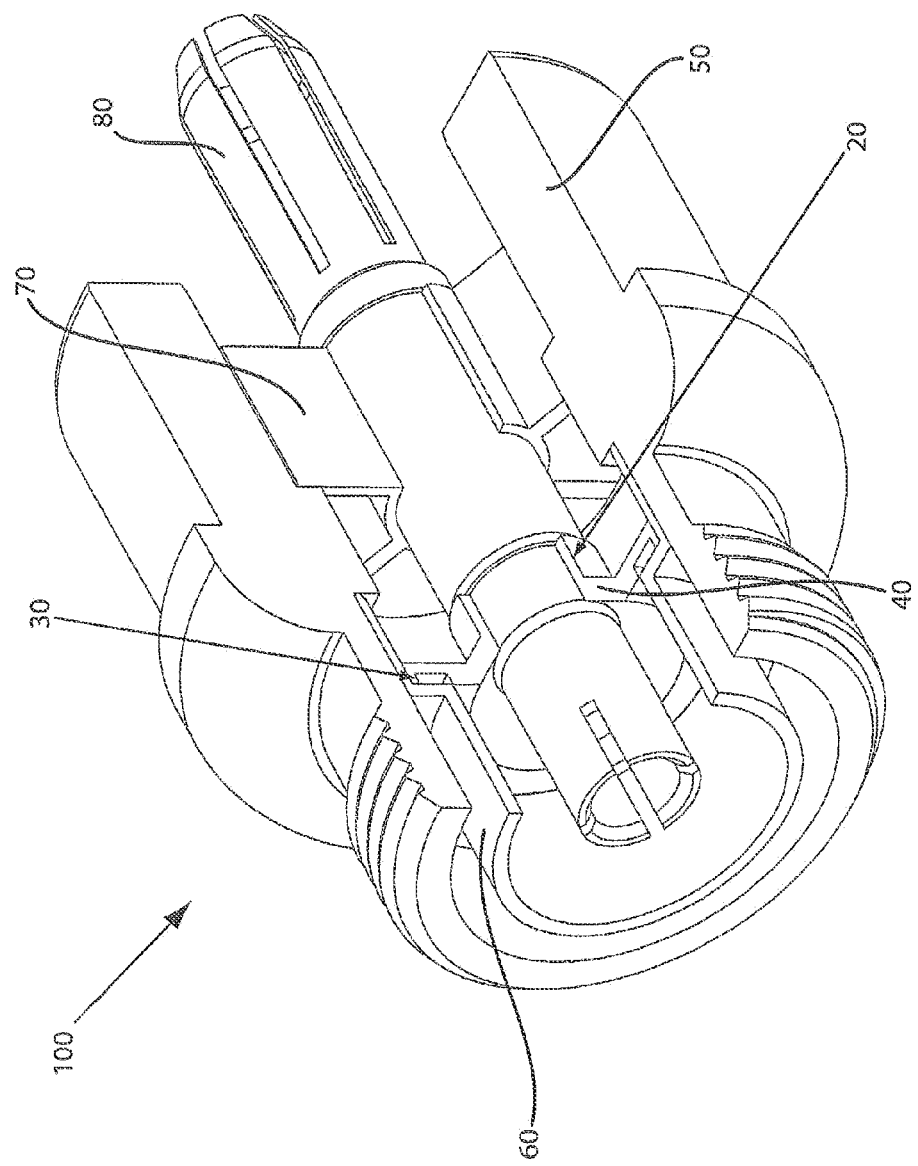
FIG. 3 depicts a cut-away perspective view of the coaxial cable connector of FIGS. 1-2, in accordance with one embodiment.

Referring now specifically to FIGS. 1-3, the connector body 50 may comprise a physical structure that houses at least a portion of any internal components of a coaxial cable connector 100. Accordingly the connector body 50 may accommodate internal positioning of various components, such as a first spacer 40, an interface sleeve 60, a second spacer 70, and a center conductor contact 80. These components may be assembled within the connector 100. In addition, the connector body 50 may be conductive. The structure of the various component elements included in the connector 100 and the overall structure of the connector 100 may operably vary. However, a governing principle behind the elemental design of all features of a coaxial connector 100 is that the connector 100 should be compatible with common coaxial cable interfaces pertaining to typical coaxial cable communications devices. Accordingly, the structure related to the embodiments of the various Figures is intended to be exemplary. Those skilled in the art should appreciate that the connector 100 may include any operable structural design allowing the connector 100 to sense a condition of a connection of the connector 100 with an interface to an RF port of a common coaxial cable communications device, and also report a corresponding connection performance status to a location outside of the connector 100. Additionally, connector 100 may include any operable structural design allowing the connector 100 to sense, detect, and measure a condition or parameter of an electrical signal flowing through the connector 100.

Hereinafter, it should be understood that a condition of a connector connection at a given time, or over a given time period, may comprise a physical parameter status relative to a connected coaxial cable connector. A physical parameter status is an ascertainable physical state relative to the connection of the coaxial cable connector, wherein the physical parameter status may be used to help identify whether the connector connection performs accurately. A condition of a signal flowing through a connector at a given time, or over a given time period, may also comprise an electrical parameter of a signal flowing through a coaxial cable connector. An electrical parameter may comprise, among other things, an electrical signal (RF) power level, wherein the electrical signal power level may be used for discovering, troubleshooting and eliminating interference issues in a transmission line (e.g., a transmission line used in a cellular telephone system). Embodiments of the connector 100 of the present invention may be considered "smart", in that the connector 100 itself ascertains physical parameter status pertaining to the connection of the connector 100 to an RF port. Additionally, embodiments of a connector 100 of the present invention may be considered "smart", in that the connector 100 itself detects and measures a parameter of an electrical signal (e.g., an RF power level) flowing through a coaxial connector. Hereinafter, it should be understood that "parameter status" or "status" of a connector may refer to one or both of physical and electrical parameter statuses.

The coaxial cable connector 100 may have internal circuitry that may sense connection conditions, store data, and/or determine monitorable variables of parameter statuses such as presence of moisture (humidity detection, as by mechanical, electrical, or chemical means), connection tightness (applied mating force existent between mated components), temperature, pressure, amperage, voltage, signal level, signal frequency, impedance, return path activity, connection location (as to where along a particular signal path a connector 100 is connected), service type, installation date, previous service call date, serial number, etc. The sensing circuit 30 may be integrated onto typical coaxial cable connector components. The sensing circuit 30 may be located on existing connector structures. For example, the connector 100 may include a component such as a first spacer 40 having a face 42. The sensing circuit 30 may be positioned on the face 42 of the first spacer 40 of the connector 100. The sensing circuit 30 is configured to sense a condition of the connector 100 when the connector 100 is connected with an interface of a common coaxial cable communications device, such as interface port 15 of a device 8 (shown in FIG. 5). Moreover, various portions of the circuitry of the sensing circuit 30 may be fixed onto multiple component elements of a connector 100.

Figure 4:
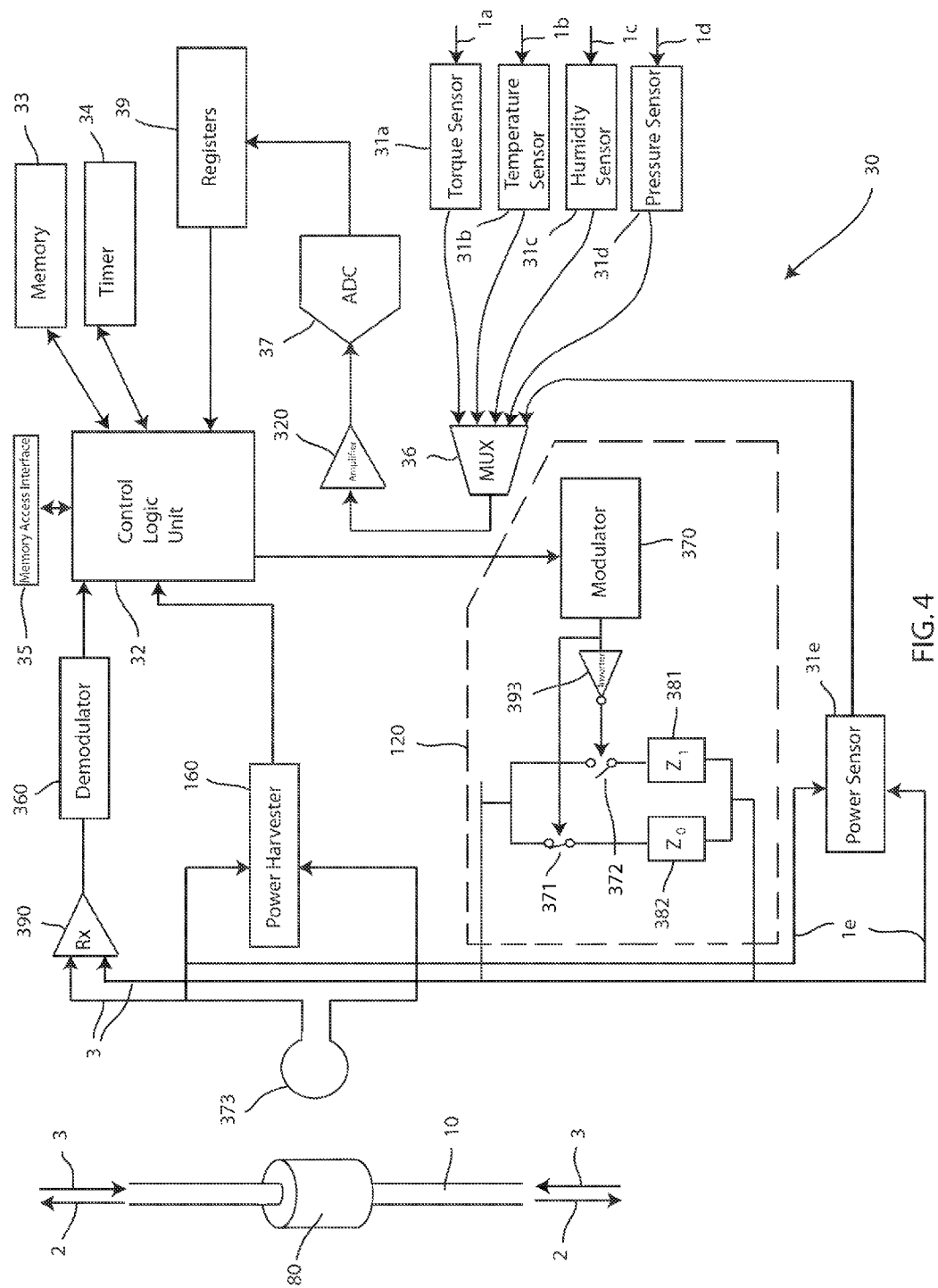
FIG. 4 depicts a schematic view of an embodiment of a circuit of a coaxial cable connector in accordance with one embodiment.

Referring now to FIG. 4, a schematic view of the sensing circuit 30 of the coaxial cable connector 100 is depicted. Embodiments of the sensing circuit 30 may be variably configured to include various electrical components and related circuitry so that the connector 100 can measure or determine connection performance by sensing a condition 1 relative to the connection of the connector 100, wherein knowledge of the sensed condition 1 may be provided as status information and used to help identify whether the connection performs accurately. Accordingly, the sensing circuit 30 configuration as schematically depicted in FIG. 4 is provided to exemplify one embodiment of circuitry that may operate with the connector 100. Those in the art should recognize that other circuit configurations may be provided to accomplish the sensing of parameters corresponding to the connector 100 connection. For instance, each block or portion of the sensing circuit 30 can be individually implemented as an analog or digital circuit.

As schematically depicted, the sensing circuit 30 may comprise one or more sensors 31. For example, the sensing circuit 30 may include a torque sensor 31a configured to detect the tightness of the connection of the connector 100 with an interface of another coaxial communications device having an RF port. The torque sensor 31a may measure, determine, detect, or otherwise sense a connection condition 1a, such as the mating force resultant from the physical connection of the connector 100 with the interface, such as RF port 15, of the device 8 (shown in FIG. 5). The connector 100 may include a plurality of sensors 31. For instance, in addition to the torque sensor 31a, the connector 100 may include: a temperature sensor 31b configured to sense a connection condition 1b, such as the temperature of all or a portion of the connector 100; a humidity sensor 31c configured to sense a connection condition 1c, such as the presence and amount of any moisture or water vapor existent in the connector 100 and/or in the connection between the connector 100 and an interface with another cable communications device; and a pressure sensor 31d configured to sense a connection 1d, such as the pressure existent in all or a portion of the connector 100 and/or in the overall connection involving the connector 100 and an interface with another cable communications device. Other sensors, such as an electrical sensor 31e may also be included in the sensing circuit 30 to help detect the connection conditions 1 related to an electrical condition 1e such as amperage, voltage, signal level, signal frequency, impedance, return path activity, connection location (as to where along a particular signal path the connector 100 is connected), service type, installation date, previous service call date, serial number, etc. The electrical sensor arrangement 31e is described in further detail herein below.

The sensed connection condition 1 may be electrically communicated within a sensing circuit 30 from one of the sensors 31a-e. For example, the sensed condition 1 may be communicated as parameter status information to a control logic unit 32. The control logic unit 32 may include and/or operate with protocol to govern what, if any, actions can or should be taken with regard to the sensed condition 1 following its electrical communication to the control logic unit 32. The control logic unit 32 may be a microprocessor or any other electrical component or electrical circuitry capable of processing a signal based on governing logic. A memory unit 33 may be in electrical communication with the control logic unit 32. The memory unit 33 may store physical parameter status information related to sensed connection conditions 1. The stored physical parameter status information may then be later communicated or processed by the control logic unit 32 or otherwise operated on by the sensing circuit 30. Furthermore the memory unit 33 may be a component or device that may store governing protocol. The governing protocol may be instructions that form a computer program, or may be simple logic commands. Stored protocol information that governs control logic operations may comprise a form of stored program architecture versatile for processing over some interval of time. The sensing circuit 30 may accordingly include a timer 34. In addition, the sensing circuit 30 may include a memory access interface 35. The memory access interface 35 may be in electrical communication with the control logic unit 32.

Various other electrical components may be included in embodiments of a sensing circuit 30. For example, where the circuit 30 includes multiple sensors 31, a multiplexer 36 may be included to integrate signals from the various sensors 31. Moreover, depending on signal strength coming from a sensor 31, the sensing circuit 30 may include an amplifier 320 to adjust the strength of the signal from the sensor 31 sufficient to be operated on by other electrical components, such as the control logic unit 32. Additionally, an ADC unit 37 (analog-to-digital converter) may be included in the sensing circuit 30. The ADC unit 37 may, if needed, convert analog signals originating from the sensors 31 to digital signals. The multiplexer 36, ADC unit 37 and amplifier 320, may all be in parallel with the control logic unit 32 and the timer 34 helping to coordinate operation of the various components. A data bus (not shown) may facilitate transfer of signal information between a sensor 31 and the control logic unit 32. The data bus may also be in communication with one or more registers 39. The registers 39 may be integral to the control logic unit 32, such as microcircuitry on a microprocessor. The registers 39 generally contain and/or operate on signal information that the control logic unit 32 may use to carry out sensing circuit 30 functions, possibly according to some governing protocol. For example, the registers 39 may be switching transistors integrated on a microprocessor, and functioning as electronic "flip-flops".

As schematically depicted, the sensing circuit 30 may further comprise an antenna 373. It should be understood that the antenna 373 may be a coupler or any other device for sending and receiving electromagnetic waves. In this embodiment, the antenna 373 may be operably connected to the center conductor 80 in order to receive an input signal 3 from the coaxial transmission line 10. While the antenna 373 is able to receive signals through free space from the center conductor 80, the connector 100 may alternately include a coupling device that may be directly connected to the center conductor 80. For example, it is contemplated that a coupling device may comprise a conductive element that is physically contacting the center conductor 80. Whatever the embodiment, the antenna 373 is configured to receive the input signals 3 and forward them through receiving circuitry 390. It should also be understood that a single antenna 373 may be sufficient to perform the functionality described herein. This single antenna embodiment is shown in FIG. 4. Alternately, an embodiment where a plurality of antennas is provided is also contemplated (not shown).

Figure 5:
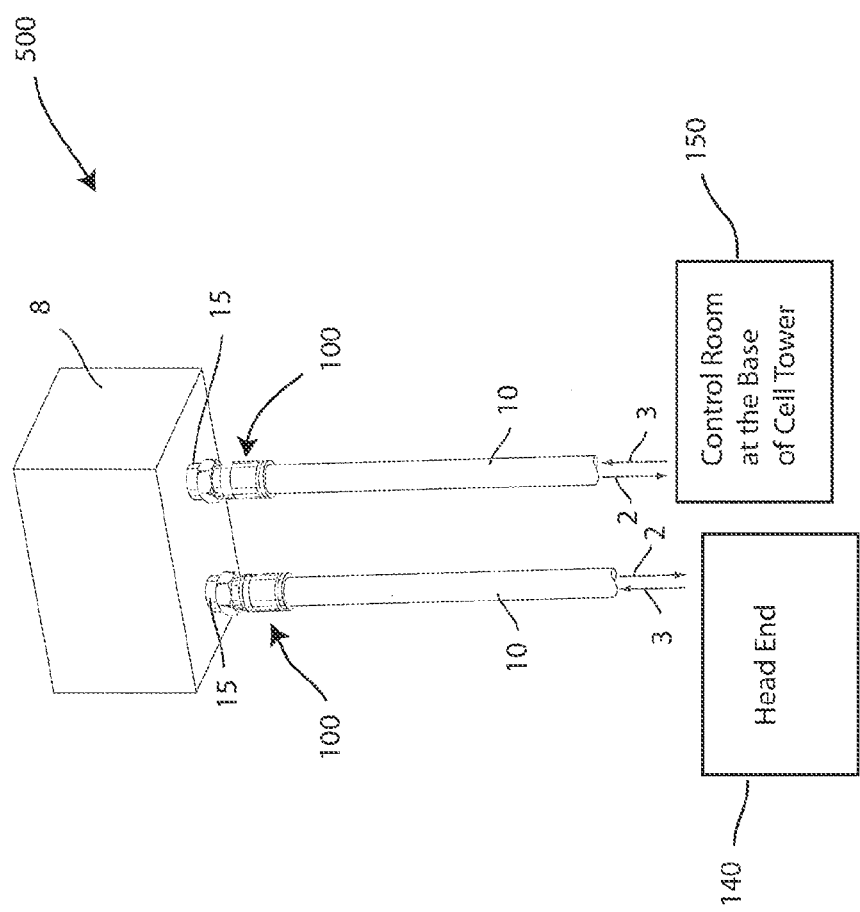
FIG. 5 depicts a schematic view of an coaxial cable connector connection system, in accordance with one embodiment.

Referring now to FIG. 5, the input signals 3 may originate from a location outside of the connector 100. In one embodiment, the input signals 3 may originate from a device along the coaxial transmission line 10 at, for example, the head end 140 or the cell tower control room 150. The input signals 3 may be an inquiry signal that is sent along the coaxial transmission line 10 by the head end 140 or cell tower control room 150 and received by the connector 100. The input signal 3 may cause the connector 100 to generate a modulated backscattered response 2. For example, the input signal 3 may request information pertaining to the status of the connector 100. This may be received through the antenna 373 and initiate the generation of a modulated backscattered response 2 that contains readable information that pertains to the torque, temperature, humidity, pressure, or other electrical condition. Thus, the head end 140 or cell tower control room 150 or other remote device may be able to poll the connector 100 and obtain connection status information remotely.

Referring back to FIG. 4, the antenna 373 may be connected to the receiving circuitry 390 that forwards input signals 3 to the control logic unit 32 and then to the rest of the backscattering arrangement 120. It should be understood that the receiving circuitry 390 may include any combination of components including but not limited to an amplifier, a mixer, a pass-band filter, an IF amplifier and the like. Any other appropriate components that are operable to facilitate communication of the input signal 3 may be included in the receiving circuitry 390, as will be understood by those skilled in the art. Thus, the antenna 373 is configured to couple the center conductor 80 to the backscattering arrangement 120.

After receiving the input signals 3 by the receiving circuitry 390, the input signals 3 may pass through a demodulator 360. The demodulator 360 may be configured to recover the information content from the carrier wave of a received input signal 3 and forward the information content to the control logic unit 32. From there, the control logic unit 32 may initiate the generation of the modulated backscattered response 2.

Once the input signal 3 is received, the generation of the modulated backscattered response 2 may first include the control logic unit 32 activating one or more of the sensors 31. The sensors 31 may sense one or more conditions including torque, temperature, humidity, pressure, or other electrical condition. These conditions may be stored in the memory unit 33 as status information that is accessible by the control logic unit 32, as described hereinabove. This status information may then be used to generate the modulated backscattered response 2 that relays the status information of the connector 100 to a remote device at another location.

To generate the modulated backscattered response 2, the control logic unit 32 may communicate with a modulator 370. The modulator 370 may modulate the operation of two switches 371, 372, which ultimately results in the connector 100 having two impedance states 381, 382. In one embodiment, the modulator 370 may close a first switch 371 and open a second switch 372. To accomplish this, an inverter 393 may be located in-line between the modulator 370 and the second switch 372. Therefore, when the modulator 370 sends a signal to open the first switch 371, this signal is inverted by the inverter 393 so that the second switch 372 closes. This embodiment is not limiting, however, and any circuitry that provides the necessary functionality may used.

When the first switch 371 is closed, a first impedance state 381 may result so that the connector 100 has a first impedance $Z_1$. The first impedance state $Z_1$ may be activated through any appropriate circuitry that would create appropriate impedance in the coaxial cable transmission line 10 resulting from the connector 100. When the second switch 372 is closed, a second impedance state 382 may be active so that the connector 100 has a second impedance $Z_0$. The second impedance state $Z_0$ may be activated through any appropriate circuitry that would create appropriate impedance in the coaxial cable transmission line 10 resulting from the connector 100. In one embodiment, the second impedance state $Z_0$ may cause the connector 100 to have very little or no impedance, which may result in very little or no backscattered reflection along the coaxial transmission line 10. Alternately, the first impedance state $Z_1$ may cause the connector 100 to have a greater impedance than the first impedance state $Z_0$ so that a backscattered reflection results when the first switch 371 is closed and the first impedance state 381 is active. The control logic unit 32 may control the modulator 370 to quickly switch between these two impedance states in order to generate the modulated backscattered response 2 along the coaxial transmission line 10. The modulation of this backscattered response 2 may correspond to the status information that is located in the memory 33.

Referring now to FIG. 5, a schematic view of an embodiment of a coaxial cable connector connection system 500 is shown. As previously described, a remote device or location, such as the head end 140 or a device in the cell tower control room 150 may send an inquiry input signal 3. The input signal 3 may be sent directly to a particular connector, such as the connector 100. Alternately, the input signal 3 may be sent throughout a network, and may include address information that pertains to a particular connector, such as the connector 100. Once received by the particular connector to which the address information pertains, the input signal may initiate the modulated backscattered response 2, as described herein above. This response 2 may then be discernable by the remote device located at the head end 140, the cell tower control room 150, or other remote location. With the modulated backscattered response 2, the remote location may then be able to ascertain the status of a connection of the connector 100 to the device 8 at the port 15.

Figure 6:
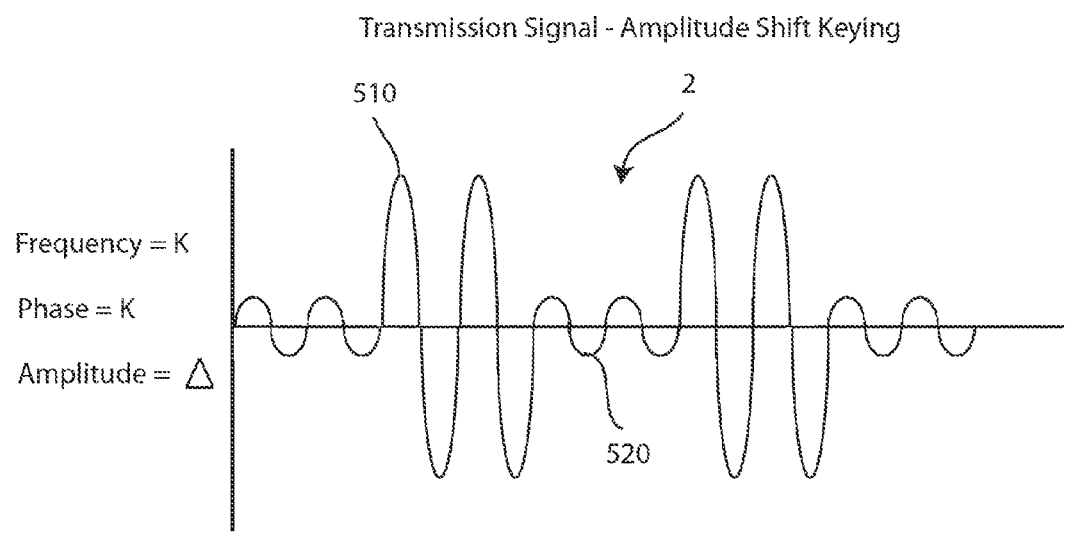
FIG. 6 depicts a graph of a signal returned from a coaxial cable connector in accordance with an amplitude shift keying embodiment.
Figure 6:
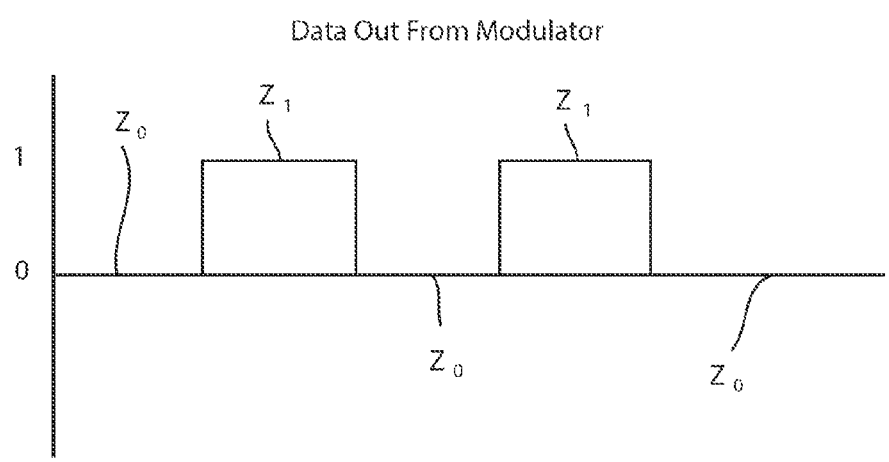

As shown in FIG. 6, the modulator 370 may be configured to modulate the impedance of the coaxial cable connector 100 to produce the modulated backscattered response 2 with amplitude shift keying. FIG. 6 shows a graphical depiction of the transmission signal 2 with amplitude shift keying, and also shows an embodiment of data that is coming out from the modulator 370. With this form of modulation, the amplitude of the carrier wave may be modulated between a greater amplitude 510 and a lesser amplitude 520, keeping phase and frequency constant. In the first impedance state $Z_1$, the amplitude of the carrier wave of the response signal may have the greater amplitude 510. Likewise, in the second impedance state $Z_0$, the amplitude of the carrier wave of the response signal may have the lesser amplitude 520. When the data coming from the modulator 370 comprises a "0", this results in the low amplitude transmission signal 520. Likewise, when the data coming from the modulator comprises a "1", this results in the high amplitude transmission signal 510. In this embodiment, the variation of the amplitudes between the two impedance states $Z_1$, $Z_0$ may comprise the modulated backscattered response 2.

Figure 7:
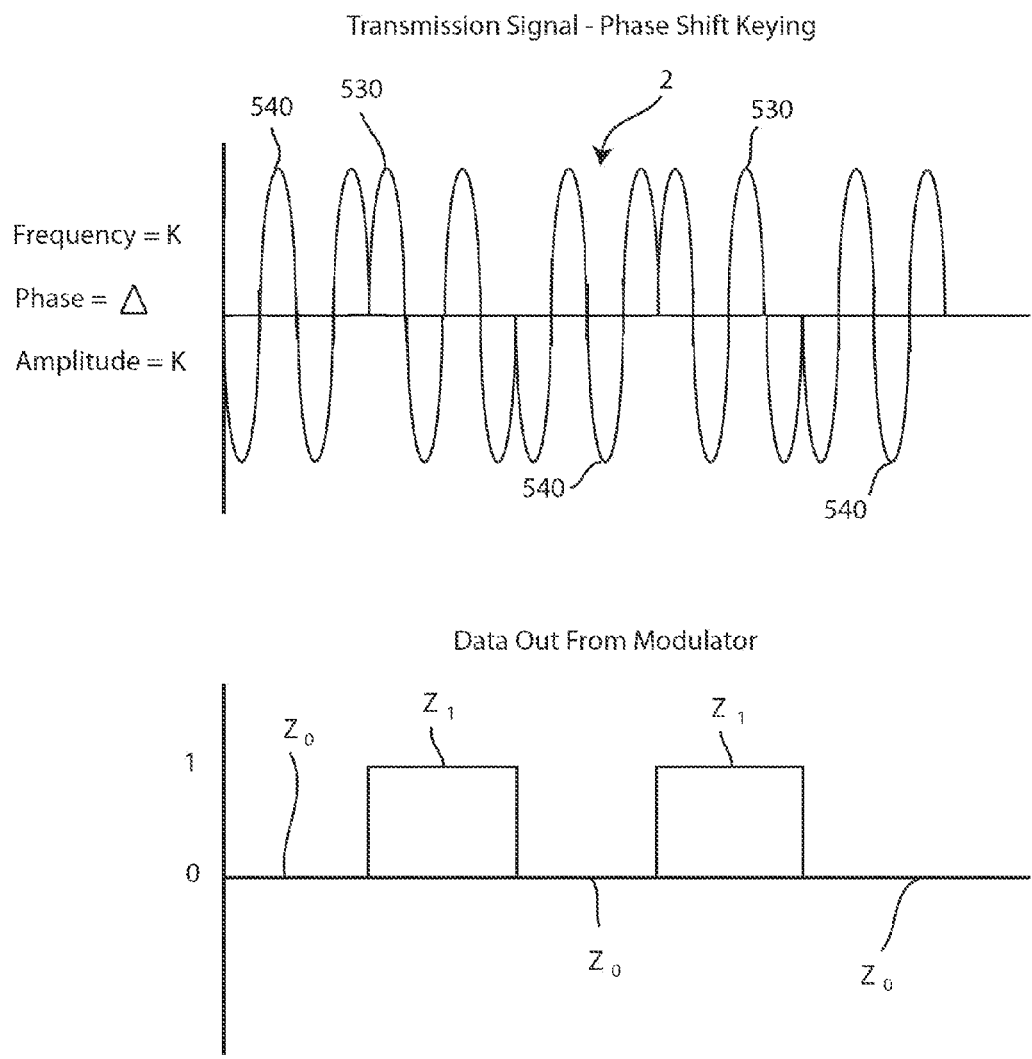
FIG. 7 depicts a graph of a signal returned from a coaxial cable connector in accordance with a phase shift keying embodiment.

As shown in FIG. 7, the modulator 370 may be configured to modulate the impedance of the coaxial cable connector 100 to produce the modulated backscattered response 2 with phase shift keying. FIG. 7 shows a graphical depiction of the transmission signal 2 with amplitude shift keying, and also shows an embodiment of data that is coming out from the modulator 370. With this form of modulation, the amplitude of the carrier wave may be modulated between a first phase 530 and a second phase 540, keeping amplitude and frequency constant. In the first impedance state $Z_1$, the phase of the carrier wave of the response signal may be the first phase 530. Likewise, in the second impedance state $Z_0$, the phase of the carrier wave of the response signal may have the second phase 540. When the data coming from the modulator 370 comprises a "0", this results in the second phase transmission signal 540. Likewise, when the data coming from the modulator comprises a "1", this results in the first phase transmission signal 530. In this embodiment, the variation of the phases between the two impedance states $Z_1$, $Z_0$ may comprise the modulated backscattered response 2.

Referring back to FIG. 4, it should be understood that the antenna 373 may facilitate sensing of various electrical conditions in addition to receiving and forwarding the input signals 3. A sensed electrical signal $1e$ may be electrically communicated within sensing circuit 30 from the antenna 373 to the electrical sensor $31e$. The electrical sensor $31e$ may retrieve the electrical signal from antenna 373 and measure a parameter of the electrical signal (e.g., an RF power level of the electrical signal). The parameter may be transmitted within the sensing circuit 30, in a similar manner as the sensed pressure, humidity, temperature and torque, described herein above. For example the parameter may be communicated as electrical signal parameter information to the control logic unit 32. The control logic unit 32 may include and/or operate with protocol to govern what, if any, actions can/should be taken with regard to the sensed condition $1e$ following its electrical communication to the control logic unit 32. The memory unit 33 may be in electrical communication with the control logic unit 32 and may store electrical signal parameter information related to sensed electrical signal $1e$. The stored electrical signal parameter information may then be later communicated or processed by the control logic unit 32 or otherwise operated on by the sensing circuit 30. It should further be understood that the electrical signal sensor $31e$ may also be a combination of sensors configured to detect signal conditions or levels of a signal such as amperage, voltage, signal level, signal frequency, impedance, return path activity, connection location (as to where along a particular signal path a connector 100 is connected), service type, installation date, previous service call date, serial number, etc.

The antenna 373 may further be in operable communication with a power harvester 160. The power harvester 160 may be configured to harvest power through the antenna 373 from the coaxial transmission line 10. While the Figures show that the power harvester harvests power for the control logic unit 32, it should be understood that the power harvested may harvest power for any of the other electronic elements of the connector 100 including the sensors 31, the multiplexer 36, the amplifier 320, the ADC unit 37, the registers 39, the memory access interface 35, the memory 33, the timer 34, the demodulator 360, the modulator 370, the inverter 373, and the like. The power harvester 160 may be configured to harvest enough energy to power any or all of these electronic components. In one embodiment, the power harvester 160 is always in operation when the connector 10 is connected to an active RF port. Thus, the power harvester 160 may be operable during data communication between the coaxial cable connector 10 and another location. Because the response signals of the connector 100 are generated through backscattering, no multiplexer is necessary to turn off the power harvester 160 during the receiving and transmission of signals by the connector 100. Because of the fact that the power harvester 160 may always be operational, the connector 10 may not require an additional energy storage device, such as a battery, in order to properly function.

Figure 8:
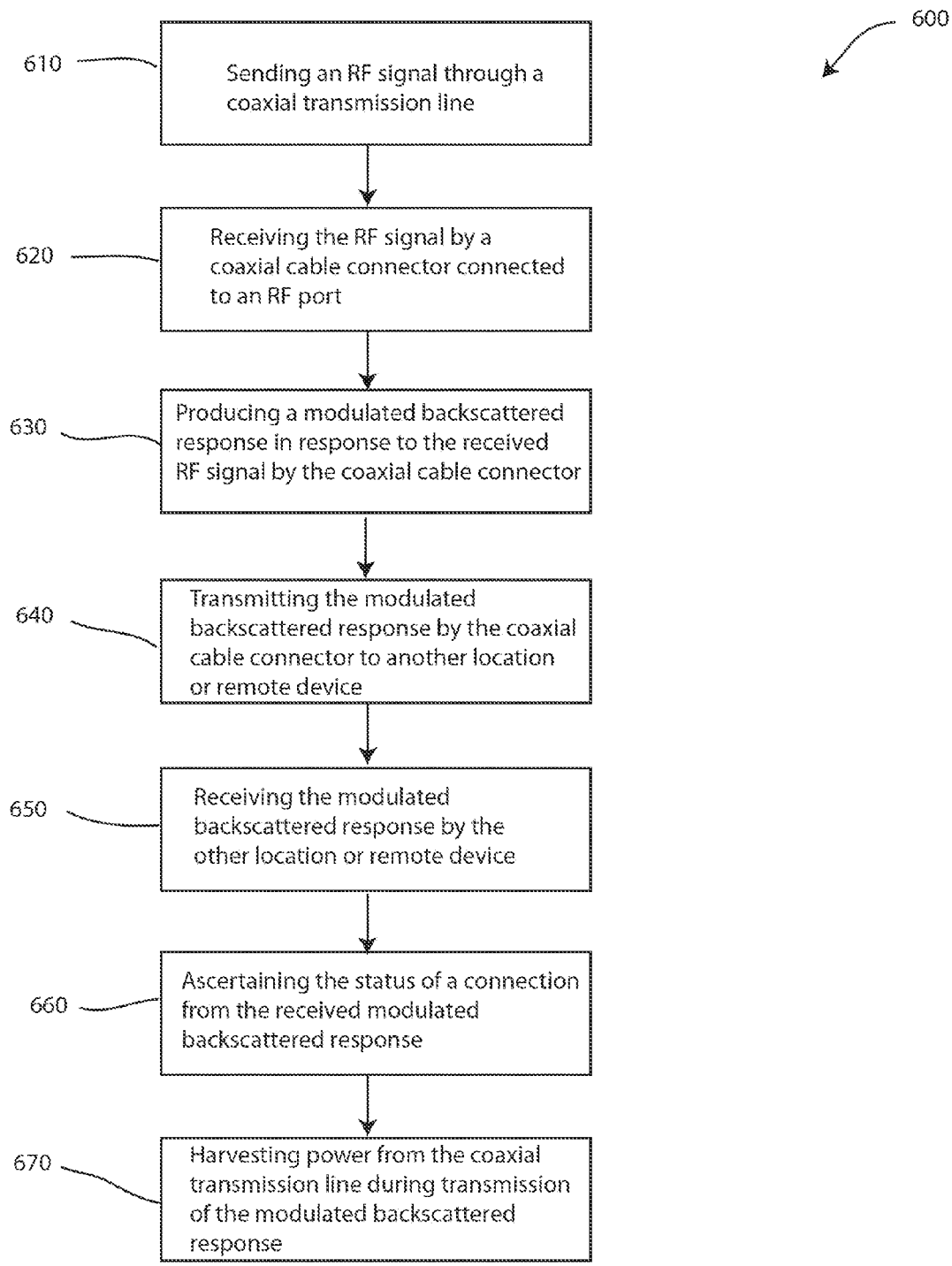
FIG. 8 depicts a coaxial cable connector connection status ascertainment method, in accordance with one embodiment.

Referring now to FIG. 8, a coaxial cable connector connection status ascertainment method 600 is shown. The method 600 may include a first step 610 of sending an RF signal, such as the input signal 3, through a coaxial transmission line, such as the coaxial transmission line 10. This sending step 610 may be done by a remote device, such as the head end 140 or the cell tower control room 150, described herein above. The method 600 may further include a step 620 of receiving the RF signal by a coaxial cable connector, such as the connector 100, connected to an RF port, such as the port 15. Still further, the method may include a step 630 of producing a modulated backscattered response, such as the modulated backscattered response 2, by the coaxial cable connector, in response to the received RF signal. The modulated backscattered response may correspond to a sensed condition of the coaxial cable connector, such as the torque, temperature, humidity, pressure, or other electrical condition. Still further, the method 600 may include a step 640 of transmitting the modulated backscattered response, by the coaxial cable connector, to another location, such as the head end 140 or the cell tower control room 150. The method 600 may then include a step 650 of receiving the modulated backscattered response by the remote device. The method 600 may then comprise a step 660 of ascertaining the status of a connection from the received modulated backscattered response. Finally, the method may include a step 670 of harvesting power from the coaxial transmission line. This step 670 may be performed during the transmission of the modulated backscattered response.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A coaxial cable connector, the connector comprising:
   a backscattering arrangement configured to receive an RF signal in a coaxial transmission line and produce a modulated backscattered response, the modulated backscattered response corresponding to a sensed condition in the coaxial cable connector.

2. The coaxial cable connector of claim 1, further comprising a modulator configured to modulate the impedance of the coaxial cable connector to create the modulated backscattered response.

3. The coaxial cable connector of claim 1, further comprising a sensing circuit configured to sense the sensed condition of the coaxial cable connector.

4. The coaxial cable connector of claim 1, wherein the modulator is configured to modulate the impedance of the coaxial cable connector to produce the modulated backscattered response with amplitude shift keying modulation.

5. The coaxial cable connector of claim 1, wherein the modulator is configured to modulate the impedance of the coaxial cable connector to produce the modulated backscattered response with phase shift keying modulation.

6. The coaxial cable connector of claim 1, wherein the backscattering arrangement further comprises an antenna that is configured to receive the RF signal in the coaxial transmission line.

7. The coaxial cable connector of claim 1, further comprising a power harvester configured to harvest power from the coaxial transmission line for at least one component of the coaxial cable connector.

8. The coaxial cable connector of claim 7, wherein the power harvester is operable during data communication between the coaxial cable connector and another location.

9. The coaxial cable connector of claim 1, wherein an impedance of the coaxial cable connector is modulated by the modulator between a first impedance state and a second impedance state, wherein the first impedance state produces at least one of:
   very little reflection; and
   no reflection; and
   wherein the second impedance state produces a backscattered reflection.

10. The coaxial cable connector of claim 1, wherein the backscattering arrangement further comprises a plurality of antennas.

11. A coaxial cable connector comprising:
    means for receiving an RF signal in a coaxial transmission line and producing a modulated backscattered response, the modulated backscattered response corresponding to a sensed condition in the coaxial cable connector.

12. The coaxial cable connector of claim 11, further comprising a means for modulating the impedance of the coaxial cable connector to create the modulated backscattered response.

13. The coaxial cable connector of claim 11, further comprising a means for sensing the sensed condition of the coaxial cable connector.

14. The coaxial cable connector of claim 11, wherein the means for modulating the backscattered signal is configured to modulate the impedance of the coaxial cable connector to produce the modulated backscattered response with amplitude shift keying modulation.

15. The coaxial cable connector of claim 11, wherein the means for modulating the backscattered signal is configured to modulate the impedance of the coaxial cable connector to produce the modulated backscattered response with phase shift keying modulation.

16. The coaxial cable connector of claim 11, wherein the backscattering arrangement further comprises an antenna that is configured to receive the RF signal in the coaxial transmission line.

17. The coaxial cable connector of claim 11, further comprising a means for harvesting power from the coaxial transmission line for at least one component of the coaxial cable connector.

18. The coaxial cable connector of claim 17, wherein the means for harvesting power is operable during data communication between the coaxial cable connector and another location.

19. The coaxial cable connector of claim 11, wherein an impedance of the coaxial cable connector is modulated by the modulator between a first impedance state and a second impedance state, wherein the first impedance state produces at least one of:
   very little reflection; and
   no reflection; and
wherein the second impedance state produces a backscattered reflection.

20. The coaxial cable connector of claim 11, wherein the means for receiving an RF signal in a coaxial transmission line and producing a modulated backscattered response further comprises a plurality of antennas.

21. A coaxial cable system, the system comprising:
   a remote device configured to send an RF signal through a coaxial transmission line; and
   a coaxial cable connector connected to the RF port, the coaxial cable connector configured to receive the RF signal in a coaxial transmission line and produce a backscattered response, the backscattered response being modulated in response to a sensed condition of the coaxial cable connector.

22. The coaxial cable system of claim 21, wherein the remote device is a head end.

23. The coaxial cable system of claim 21, wherein the remote device is a device located in a control room at a cell tower.

24. The coaxial cable system of claim 21, wherein the modulated backscattered response is transmitted back through the coaxial transmission line.

25. The coaxial cable system of claim 24, wherein at least one of the remote device and a second remote device is configured to receive the modulated backscattered response.

26. A coaxial cable connector connection status ascertainment method comprising:
   sending an RF signal through a coaxial transmission line;
   receiving an RF signal by a coaxial cable connector connected to an RF port;
   producing a modulated backscattered response, by the coaxial cable connector, in response to the received RF signal, the modulated backscattered response corresponding to a sensed condition of the coaxial cable connector; and
   transmitting the modulated backscattered response, by the coaxial cable connector, to another location.

27. The coaxial cable connector connection status ascertainment method of claim 26, further comprising sending the RF signal through a coaxial transmission line by a remote device.

28. The coaxial cable connector connection status ascertainment method of claim 27, further comprising receiving the modulated backscattered response by the remote device.

29. The coaxial cable connector connection status ascertainment method of claim 28, further comprising ascertaining the status of a connection from the received modulated backscattered response.

30. The coaxial cable connector connection status ascertainment method of claim 26, further comprising harvesting power, by the coaxial cable connector, from the coaxial transmission line.

31. The coaxial cable connector connection status ascertainment method of claim 26, further comprising harvesting power, by the coaxial cable connector, from the coaxial transmission line during the transmitting of the modulated backscattered response.

32. A coaxial cable connector for connection to an RF port, the connector comprising:
   a sensing circuit, positioned within the connector body, the sensing circuit configured to sense a condition of the connector when connected to the RF port;
   a signal generation component in operable communication with the sensing circuit, the signal generation component configured to generate a modulated signal that corresponds to a sensed condition by the sensing circuit; and
   a power harvester configured to harvest power from the coaxial transmission line usable by at least one component of the coaxial cable connector, the power harvester being operable during generation of the modulated signal by the signal generation component.

\* \* \* \* \*